(12) United States Patent
Miller

(10) Patent No.: US 11,554,725 B2
(45) Date of Patent: Jan. 17, 2023

(54) INTERNALLY DAMPED CROSSBAR ASSEMBLY HAVING WIRE ROPE ISOLATOR

(71) Applicant: Raytheon Company, Waltham, MA (US)

(72) Inventor: Kirk A. Miller, Dallas, TX (US)

(73) Assignee: Raytheon Company, Waltham, MA (US)

(*) Notice: Subject to any disclaimer, the term of this patent is extended or adjusted under 35 U.S.C. 154(b) by 483 days.

(21) Appl. No.: 16/721,754

(22) Filed: Dec. 19, 2019

(65) Prior Publication Data
US 2021/0188187 A1 Jun. 24, 2021

(51) Int. Cl.
*B60R 11/00* (2006.01)
*F16F 13/00* (2006.01)
(Continued)

(52) U.S. Cl.
CPC .............. *B60R 11/00* (2013.01); *F16F 13/00* (2013.01); *F16M 13/02* (2013.01); *G01D 11/10* (2013.01);
(Continued)

(58) Field of Classification Search
CPC . B60R 11/00; B60R 2011/0064; F16M 11/18; F16M 11/12; F16M 13/02;
(Continued)

(56) References Cited

U.S. PATENT DOCUMENTS

| 704,403 A | 7/1902 | Thill |
|---|---|---|
| 1,824,085 A | 9/1931 | Karnes et al. |

(Continued)

FOREIGN PATENT DOCUMENTS

| CN | 100585052 C | 1/2010 |
|---|---|---|
| EP | 2798314 A1 | 11/2014 |

(Continued)

OTHER PUBLICATIONS

Leonardo Drs, Mast Muonted Sight (MMS), https://www.leonardodrs.com/media/3296/mms_datasheet.pdf, to the best of applicant's knowledge article was available before the application filing date, 2 pages, Melbourne, Florida.

(Continued)

*Primary Examiner* — Brian D Nash

(57) ABSTRACT

A crossbar assembly for facilitating isolation of a sensor assembly from vibration comprises an outer crossbar segment, an inner crossbar segment, and an isolator. The outer crossbar segment comprises a payload mount interface and an outer isolator interface operable to mount to an isolator. The inner crossbar segment comprises a structure interface and an inner isolator interface operable to mount to the isolator. The isolator can be supported by the outer and inner crossbar segments. The isolator comprises a first wire rope assembly comprising wire ropes extending longitudinally from the outer crossbar segment to the inner crossbar segment, and a second wire rope assembly comprising a wire rope extending circumferentially between the outer and inner crossbar segments. The isolator operates to partially decouple the outer crossbar segment from the inner crossbar segment and dampen vibrations propagating between the outer and inner crossbar segments.

20 Claims, 8 Drawing Sheets

(51) Int. Cl.
*G01D 11/10* (2006.01)
*F16M 13/02* (2006.01)
*B60R 11/04* (2006.01)

(52) U.S. Cl.
CPC ....... *B60R 11/04* (2013.01); *B60R 2011/0064* (2013.01); *B60R 2011/0084* (2013.01); *B60R 2011/0085* (2013.01); *F16F 2224/0208* (2013.01)

(58) Field of Classification Search
CPC .......... F16F 15/08; F16F 13/00; G03B 15/00; G01D 11/10
See application file for complete search history.

(56) References Cited

U.S. PATENT DOCUMENTS

| | | | |
|---|---|---|---|
| 2,378,744 | A | 6/1945 | Annen |
| 3,385,542 | A | 5/1968 | Enemark et al. |
| 3,773,285 | A * | 11/1973 | Morrill ................. F04D 29/668 244/230 |
| 4,318,522 | A | 3/1982 | Appleberry |
| 4,341,452 | A | 7/1982 | Korling |
| 4,498,038 | A | 2/1985 | Malueg |
| 4,625,938 | A * | 12/1986 | Brown ................. F16M 11/2014 352/197 |
| 4,669,843 | A | 6/1987 | Bozzolato |
| 5,184,521 | A | 2/1993 | Tyler |
| 5,368,271 | A | 11/1994 | Kiunke et al. |
| 5,897,223 | A | 4/1999 | Tritchew et al. |
| 6,003,829 | A | 12/1999 | Martinsson |
| 6,454,229 | B1 | 9/2002 | Voigt et al. |
| 6,484,978 | B2 | 11/2002 | Voigt et al. |
| 7,000,883 | B2 * | 2/2006 | Mercadal ............... F16M 11/18 396/428 |
| 7,324,747 | B2 | 1/2008 | Kempas |
| 7,561,784 | B2 | 7/2009 | Wescott et al. |
| 7,699,691 | B1 | 4/2010 | Voigt et al. |
| 8,100,377 | B1 | 1/2012 | Blackburn |
| 8,844,896 | B2 | 9/2014 | Pettersson |
| 9,348,197 | B2 * | 5/2016 | Lewis .................. F16M 11/123 |
| 9,765,925 | B2 | 9/2017 | Lewis |
| 10,906,636 | B2 * | 2/2021 | Welsh .................... F16F 15/02 |
| 2002/0158181 | A1 * | 10/2002 | Carter .................. F16F 15/063 248/560 |
| 2002/0158182 | A1 * | 10/2002 | Carter ..................... F16F 15/06 248/550 |
| 2005/0031335 | A1 * | 2/2005 | Itzkowitz ............... F16M 13/02 396/419 |
| 2008/0158371 | A1 | 7/2008 | Trescott |
| 2009/0148150 | A1 | 6/2009 | Valles Navarro et al. |
| 2009/0216394 | A1 | 8/2009 | Heppe et al. |
| 2010/0234844 | A1 | 9/2010 | Edelhauser et al. |
| 2014/0176717 | A1 | 6/2014 | De Paschoal |
| 2016/0139494 | A1 | 5/2016 | Tien et al. |
| 2017/0175948 | A1 | 6/2017 | Zeise et al. |
| 2018/0004064 | A1 | 1/2018 | Kim |
| 2020/0173511 | A1 | 6/2020 | Miller et al. |
| 2020/0307826 | A1 | 10/2020 | Zhang et al. |
| 2021/0188187 | A1 | 6/2021 | Miller |
| 2021/0190170 | A1 | 6/2021 | Miller et al. |
| 2021/0190171 | A1 | 6/2021 | Miller et al. |
| 2021/0190263 | A1 | 6/2021 | Thomas |

FOREIGN PATENT DOCUMENTS

| | | |
|---|---|---|
| EP | 3220006 A1 | 9/2017 |
| JP | 2000-214745 A | 8/2000 |
| JP | 2002-154491 A | 5/2002 |
| JP | 5090293 B2 | 12/2012 |
| KR | 101362926 B1 | 2/2014 |
| KR | 101979293 B1 | 5/2019 |
| WO | WO 1996/02770 A1 | 2/1996 |
| WO | WO 2015/149079 A1 | 10/2015 |
| WO | WO 2017/179160 A1 | 10/2017 |

OTHER PUBLICATIONS

International Search Report for International Application No. PCT/US2020/056148 dated Feb. 16, 2021, 14 pages.
International Search Report for International Application No. PCT/US2020/056155 dated Feb. 23, 2021, 32 pages.
International Search Report for International Application No. PCT/US2020/056167 dated Feb. 12, 2021, 15 pages.
International Search Report for International Application No. PCT/US2020/056126 dated Feb. 3, 2020, 10 pages.
International Search Report for International Application No. PCT/US2020/056135 dated Feb. 11, 2020, 14 pages.

* cited by examiner

INTERNALLY DAMPED CROSSBAR ASSEMBLY HAVING WIRE ROPE ISOLATOR

BACKGROUND

Sensors, such as imaging sensors, can be mounted to mobile vehicles, such as aircraft, land vehicles, and watercraft using a payload system mount rotatably coupled to the vehicle. The payload system mount with its rotatable coupling can include at least two rotating joints. For example, a first rotating joint can allow azimuth rotation of the payload system mount while a second rotating joint coupled to the first rotating joint can allow elevational rotation of the payload system mount. A crossbar system can be coupled to the payload system mount and can support a sensor assembly (e.g., an imaging assembly or system) in isolation. The sensor assembly can be mounted at a central location of the crossbar system and a first and second end of the crossbar system can be coupled to the payload system mount. Thus, the first rotating joint can be configured to facilitate azimuth rotation of the sensor assembly, and the second rotating joint can be configured to facilitate elevational rotation of the sensor assembly.

The crossbar system is configured to transmit motion of the payload system mount to the sensor assembly. However, it is not desirable to transmit all motion to the sensor assembly. For example, sensors can be sensitive to vibration and sudden acceleration (e.g., due to shock or other loads) and can experience a loss of resolution when subjected to these. For example, vehicles experience accelerations and vibrations during operation that can be detrimental to the functioning of the sensor. These accelerations and vibrations, if not isolated and damped, can be transmitted from the vehicle through the payload mount system to the sensor assembly and the sensor payload.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
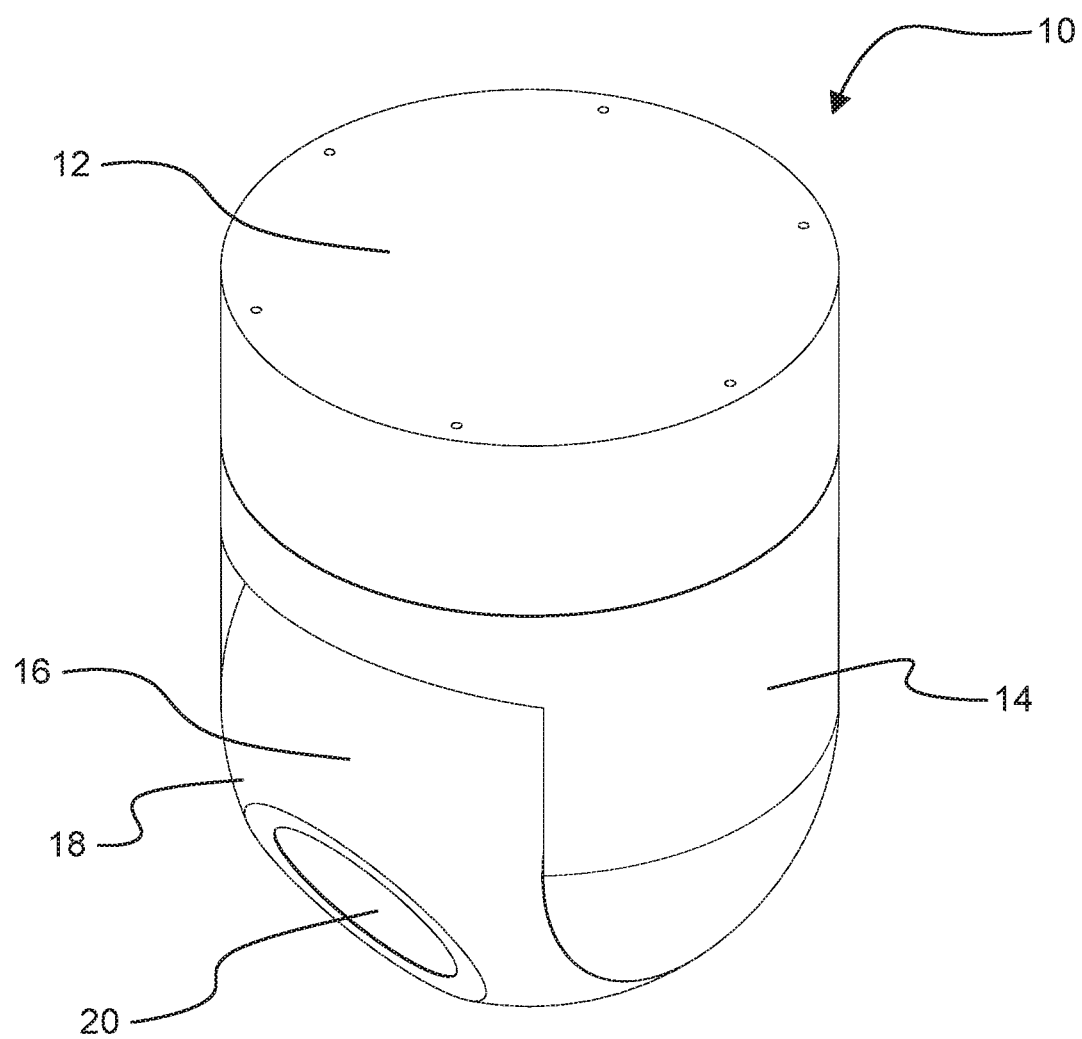
FIG. 1 illustrates an isometric view of a payload mounting system in accordance with an example of the present disclosure.

Reference will now be made to the examples illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property state, structure, item, or result.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

In one example, disclosed is a crossbar system for facilitating isolation of a sensor assembly from external vibration of a structure. The crossbar system comprises a first crossbar assembly, a second crossbar assembly, and a payload mount. The first crossbar assembly comprises a first structure interface operable to mount to a structure, a first payload mount interface operable to couple to a payload mount, and a first isolator between the first structure interface and the first payload mount interface. The first isolator comprises a first wire rope assembly having at least two wire ropes extending longitudinally and a second wire rope assembly having at least one wire rope extending circumferentially. The first and second wire rope assemblies are operable to partially decouple the first structure interface and the first payload mount interface and dampen vibrations propagating through the first crossbar assembly. The second crossbar assembly comprises a second structure interface operable to mount to the structure, a second payload mount interface operable to couple to the payload mount, and a second isolator between the second structure interface and the second payload mount interface. The second isolator comprises a third wire rope assembly extending longitudinally and a forth wire rope assembly comprising at least one wire rope extending circumferentially. The third and fourth wire rope assemblies are operable to partially decouple the first structure interface and the second payload mount interface and dampen vibrations propagating through the second crossbar assembly. The payload mount is coupled to the first payload mount interface and the second payload mount interface and is operable to mount a sensor assembly.

In accordance with a more detailed aspect, the first crossbar assembly can further comprise a first outer crossbar segment coupled to the first structure interface and the first isolator, and a first inner crossbar segment coupled to the first payload mount interface and the first isolator. The second crossbar assembly can further comprise a second outer crossbar segment coupled to the second structure interface and the second isolator, and a second inner crossbar segment coupled to the second payload mount interface and the second isolator.

In accordance with a more detailed aspect, each wire rope of the at least two wire ropes can be coupled to the first outer crossbar segment at a first end of the wire rope at an angle offset from a central axis of the first outer crossbar segment and to the inner crossbar segment at a second end of the wire rope at an angle offset from a central axis of the first inner crossbar segment.

In accordance with a more detailed aspect, the second wire rope assembly can comprise an inner crossbar appendage and an outer crossbar appendage, and the at least one wire rope c coupled to the inner crossbar appendage and the outer crossbar appendage.

In accordance with a more detailed aspect, the crossbar system can further comprise a first clamping plate operable to clamp the at least one wire rope between the first clamping plate and the inner crossbar appendage and a second clamping plate operable to clamp the at least one wire rope between the second clamping plate and the outer crossbar appendage.

In accordance with a more detailed aspect, the crossbar system can further comprise a first conical clamp and a second conical clamp. The first conical clamp can secure the at least two wire ropes of the first wire rope assembly to the inner crossbar segment and the second conical clamp can secure the at least two wire ropes of the first wire rope assembly to the outer crossbar segment.

Also disclosed is a crossbar assembly for facilitating isolation of a sensor assembly from external vibration of a payload system mount on a vehicle. The crossbar assembly comprises the crossbar assembly comprises an outer crossbar segment, an inner crossbar segment, and an isolator. The outer crossbar segment comprises a payload mount interface operable to mount to a payload mount, and an outer isolator interface operable to mount to an isolator. The inner crossbar segment can be moveable relative to the outer crossbar segment in multiple degrees of freedom and comprises a structure interface operable to mount to a structure, and an inner isolator interface operable to mount to the isolator. The isolator can be supported by the outer and inner crossbar segments and comprises a first wire rope assembly comprising at least two wire ropes extending longitudinally from the outer crossbar segment to the inner crossbar segment, and a second wire rope assembly comprising at least one wire rope extending circumferentially between the outer crossbar segment and the inner crossbar segment. The isolator operates to partially decouple the outer crossbar segment from the inner crossbar segment and dampen vibrations propagating between the outer and inner crossbar segments.

In accordance with a more detailed aspect, the outer isolator interface can comprise a first clamp operable to secure the at least two wire ropes of the first wire rope assembly to the outer isolator interface, at least one appendage extending longitudinally from the outer crossbar segment, and at least one clamp operable to secure the at least one wire rope of the second wire rope assembly to the at least one appendage.

In accordance with a more detailed aspect, the inner isolator interface can comprise a first clamp operable to secure the at least two wire ropes of the first wire rope assembly to the outer isolator interface, at least one appendage extending longitudinally from the inner isolator interface, and at least one clamp operable to secure the at least one wire rope of the second wire rope assembly to the at least one appendage.

In accordance with a more detailed aspect, each wire rope of the at least two wire ropes of the first wire rope assembly can be coupled to the outer crossbar segment at a first end of each respective wire rope at an angle offset from a central axis of the first outer crossbar segment and to the inner crossbar segment at a second end of each respective wire rope at an angle offset from a central axis of the first inner crossbar segment.

In accordance with a more detailed aspect, each wire rope of the first wire rope assembly can have an outer diameter greater than each wire rope of the second wire rope assembly.

In accordance with a more detailed aspect, the inner isolator interface can comprise a first plurality of appendages extending longitudinally from the inner isolator interface and the outer isolator interface comprises a second plurality of appendage extending longitudinally from the outer isolator interface. Each appendage of the first plurality of appendages can be located between two appendages of the second plurality of appendages.

In accordance with a more detailed aspect, each wire rope of the second wire rope assembly can be helically wound around the first and second appendages about a central longitudinal axis of the crossbar assembly.

In accordance with a more detailed aspect, the wire ropes of the first wire rope assembly can be symmetrically arranged about a central longitudinal axis of the crossbar assembly.

Also disclosed is a payload system mount comprising a base structure, a support structure rotatably coupled to the base structure, a crossbar system, and a sensor assembly. The crossbar system comprises a first crossbar assembly, a second crossbar assembly, and a payload mount. The support structure comprises a first crossbar assembly, a second crossbar assembly, and a payload mount. The first crossbar assembly comprises a first structure interface coupled to the structure, a first payload mount interface operable to couple to a payload mount, and a first isolator between the first structure interface and the first payload mount interface. The first isolator comprises a first wire rope assembly having at least two wire ropes extending longitudinally and a second wire rope assembly having at least one wire rope extending circumferentially. The first and second wire rope assemblies are operable to partially decouple the first structure interface and the first payload mount interface and dampen vibrations propagating through the first crossbar assembly. The second crossbar assembly comprises a second structure interface coupled to the support structure, a second payload mount interface operable to couple to the payload mount, and a second isolator between the second structure interface and the second payload mount interface. The second isolator comprises a third wire rope assembly extending longitudinally and a forth wire rope assembly comprising at least one wire rope extending circumferentially. The third and fourth wire rope assemblies operable to partially decouple the first structure interface and the second payload mount interface and dampen vibrations propagating through the second crossbar assembly. The payload mount is coupled to the first payload mount interface and the second payload mount interface. The sensor assembly is coupled to the payload mount and comprises at least one sensor.

In accordance with a more detailed aspect, the first crossbar assembly can further comprise a first outer crossbar segment coupled to the first structure interface and the first isolator, and a first inner crossbar segment coupled to the first payload mount interface and the first isolator. The second crossbar assembly can further comprise a second outer crossbar segment coupled to the second structure interface and the second isolator, and a second inner crossbar segment coupled to the second payload mount interface and the second isolator.

In accordance with a more detailed aspect, each wire rope of the at least two wire ropes can be coupled to the first outer crossbar segment at a first end of the wire rope at an angle offset from a central axis of the first outer crossbar segment and to the inner crossbar segment at a second end of the wire rope at an angle offset from a central axis of the first inner crossbar segment.

In accordance with a more detailed aspect, the second wire rope assembly can further comprise an inner crossbar appendage and an outer crossbar appendage. The at least one wire rope can be coupled to the inner crossbar appendage and the outer crossbar appendage.

In accordance with a more detailed aspect, the system can further comprise a first clamping plate operable to clamp the at least one wire rope between the first clamping plate and the inner crossbar appendage and a second clamping plate operable to clamp the at least one wire rope between the second clamping plate and the outer crossbar appendage.

In accordance with a more detailed aspect, the system can further comprise a first conical clamp and a second conical clamp. The first conical clamp can secure the at least two wire ropes of the first wire rope assembly to the inner crossbar segment and the second conical clamp can secure the at least two wire ropes of the first wire rope assembly to the outer crossbar segment.

Figure 2:
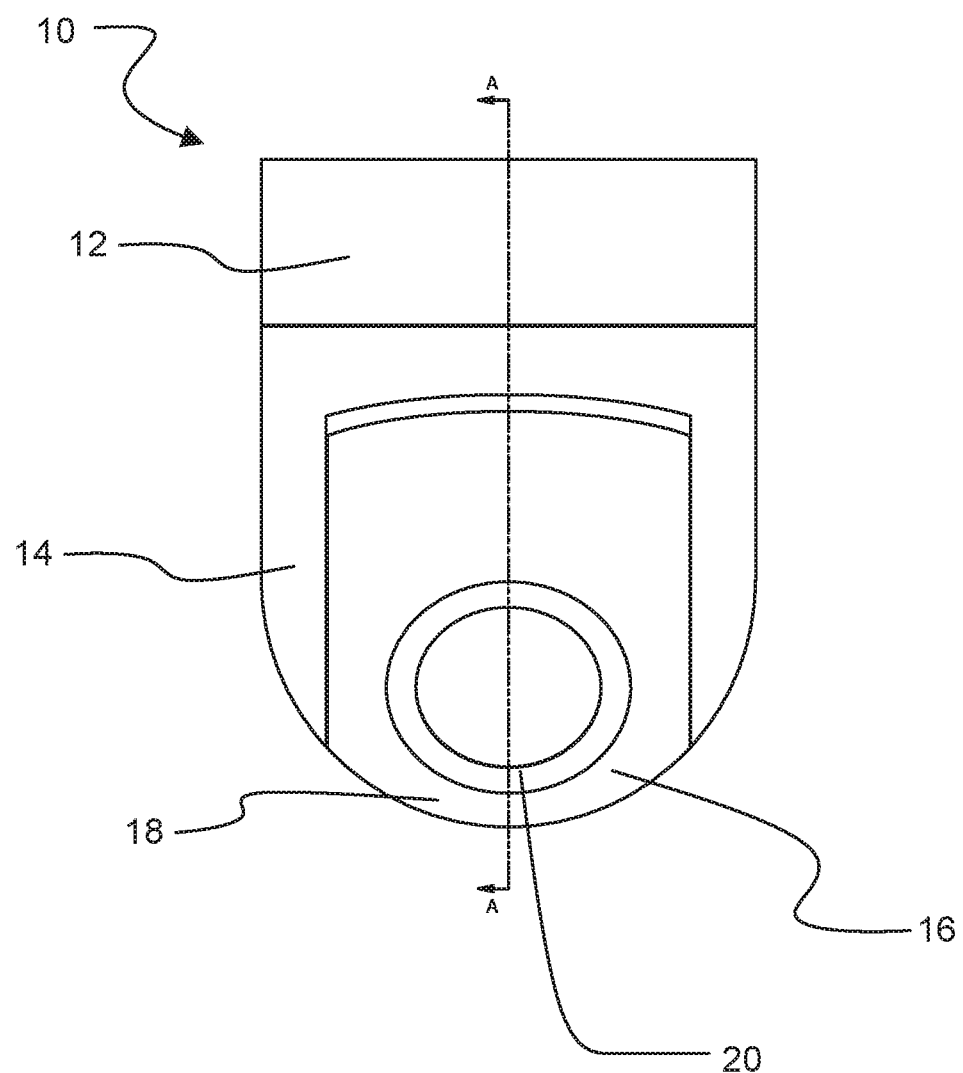
FIG. 2 illustrates a front view of the payload mounting system of FIG. 1.

To further describe the present technology, examples are now provided with reference to the figures. FIG. 1 illustrates an isometric view of a payload system mount 10 in accordance with an example of the present disclosure and FIG. 2 illustrates a front view of the payload system mount 10 of FIG. 1. With reference to FIGS. 1 and 2, the exemplary payload system mount 10 can comprise a turret mounted to a vehicle, and that is operable to support a payload, such as a sensor assembly having a sensor (e.g., an imaging sensor (e.g., a camera)), wherein the payload is supported by a crossbar system (discussed below). The turret can comprise a base 12 which can be coupled to the vehicle. A coarse azimuth platform 14 can be rotatably coupled to the base 12, and a coarse elevation platform 16 can be rotatably coupled to the coarse azimuth platform 14. The coarse elevation platform 16 can include a shell 18, which can house the payload in the form of the sensor assembly, including the sensor, and a crossbar system suspending and isolating the sensor assembly payload. A window 20 can be positioned at an outer surface of the shell 18 and provides transparent access to the sensor assembly, as well as facilitates a field of view of the sensor assembly through the payload system mount 10. For example, the sensor assembly can include a visual sensor, and the window 20 can be configured to be transparent to visible light. In another example, the sensor assembly can include a thermal radiation sensor, and the window 20 can be configured to be transparent to infrared radiation. In addition, the visual sensor, as mounted within the payload system mount 10, can be configured to sense or image objects through the window 20 that are within its field of view.

The payload system mount 10, and particularly the base 12, can be mounted or coupled to the vehicle using conventional techniques, such as bolted fasteners, weldments, or any other means as will be appreciated by those skilled in the art. Although the payload system mount 10 of FIGS. 1 and 2 is shown extending downward, in other examples the payload system mount 10 can be mounted so as to extend laterally or upward. The coarse azimuth platform 14 can be rotatably coupled to the base 12. For example, the coarse azimuth platform 14 can have a turntable type mount (not shown) rotatably coupling the coarse azimuth platform 14 to the base 12. In the example of FIGS. 1 and 2, the turntable mount can effectuate relative movement between the coarse azimuth platform 14 and the base 12 about a substantially vertical axis providing azimuthal rotation. The coarse azimuth platform 14 can be actuated using common actuators, such as electric actuators, hydraulic actuators, and others as will be appreciated and apparent to those skilled in the art.

The coarse elevation platform 16 can be rotatably coupled to the coarse azimuth platform 14. The coarse elevation platform 16 can be coupled or mounted to the coarse azimuth platform 14 by a rotating joint to effectuate movement between the coarse elevation platform 16 and the coarse azimuth platform 14. In the example of FIG. 1, the coarse elevation platform 16 can rotate relative to the coarse azimuth platform 14 about an axis that is substantially perpendicular to the axis of rotation of the coarse azimuth platform 14 relative to the base 12. For example, when the coarse azimuth platform 14 rotates about a vertical axis (from the perspective shown in FIGS. 1 and 2), the coarse elevation platform 16 can rotate about a horizontal axis.

Although FIGS. 1 and 2 illustrate the payload system mount 10 as comprising a turret type of payload system mount, this is not intended to be limiting in any way. Indeed, those skilled in the art will recognize other types of payload system mounts in which the crossbar system described herein can be used and supported for isolating a payload supported by the crossbar system. For example, an alternative configuration would be embedded behind a conformal window on the outside of a platform. Angular travel would be limited to the extents of travel of the spherical joint between the payload interface and the crossbar system. Need for vibration isolation would be the reason for having the interface between the sensor and the vehicle. Another alternative would be a pod configuration, which is essentially a turret mounted with the azimuth axis horizontal and identified as the "roll" axis.

Figure 3:
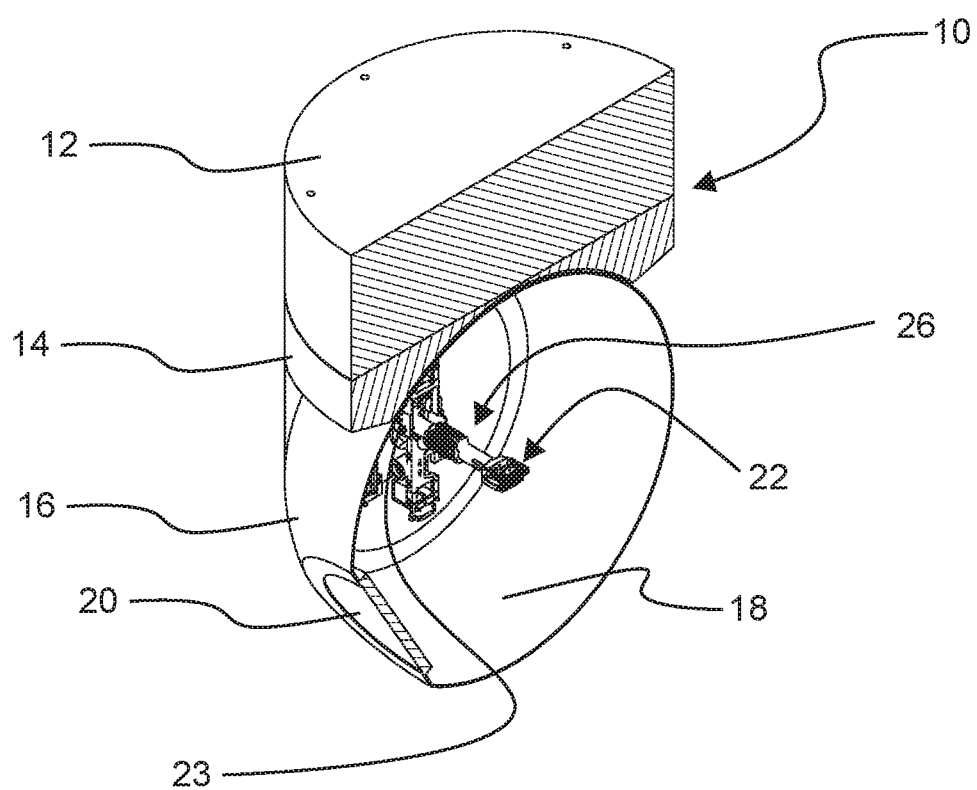
FIG. 3 illustrates an isometric, cross-sectional view of the payload mounting system of FIG. 1, taken along line AA of FIG. 2.

FIG. 3 illustrates a cross section of the payload system mount 10 of FIGS. 1 and 2, taken along line AA of FIG. 2. As shown, the payload system mount 10 can comprise a base structure, such as coarse azimuth platform 14, a support structure such as coarse elevation platform 16, and a crossbar system 26 in support of a payload mount 22. The crossbar system 26 can be coupled to the support structure of the payload system mount 10 such that rotation of the support structure relative to the base structure results in rotation of the crossbar system 26 and in turn a sensor assembly (and sensor) coupled to the payload mount 22. In some examples, the crossbar system 26 can be coupled to the coarse elevation platform 16 using conventional fastening techniques, such as threaded fasteners, adhesives, weldments, and others. The crossbar system 26 can span a width of the coarse elevation platform 16, such that the crossbar system 26 is suspended only at the distal ends 23 of the crossbar system 26.

Figure 4:
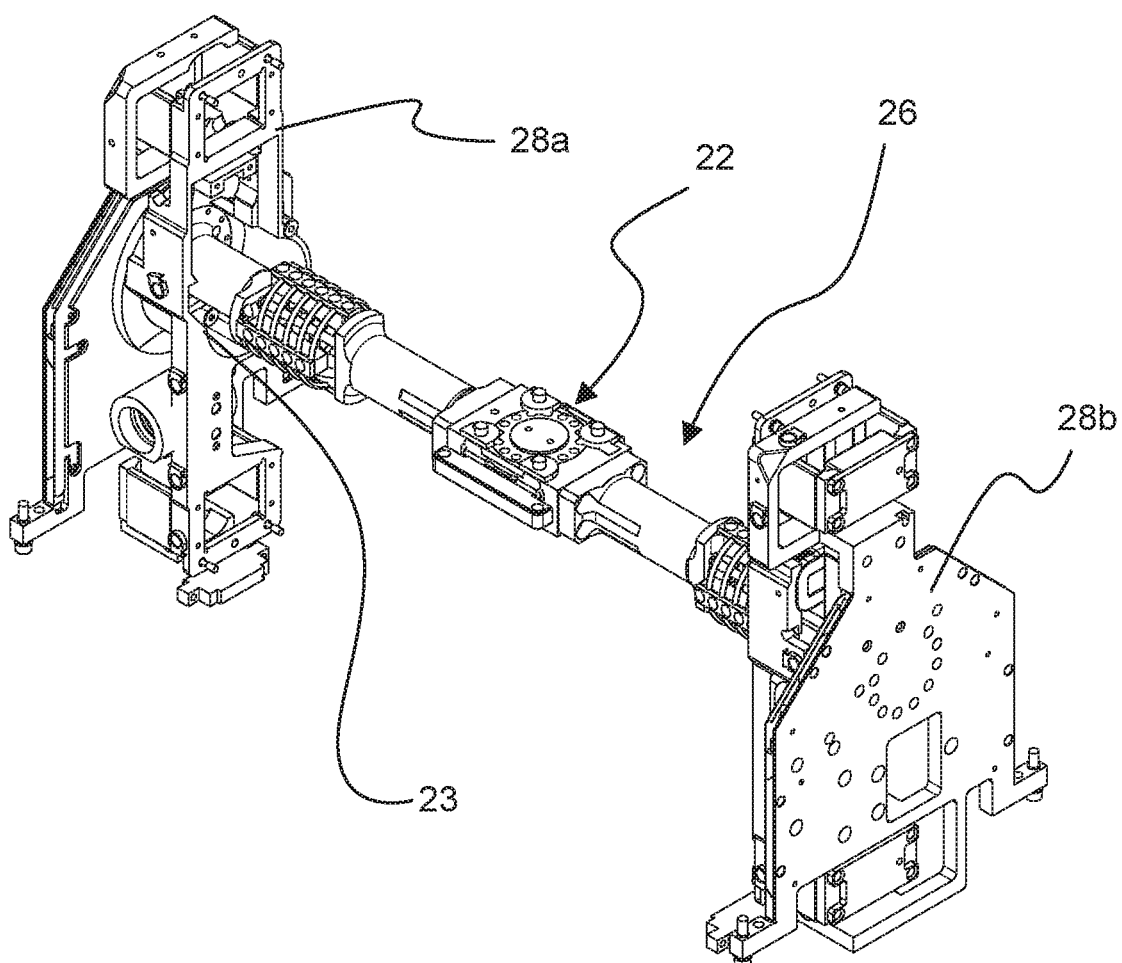
FIG. 4 illustrates an isometric view of the crossbar system and a support structure of the payload mounting system of FIG. 1.

FIG. 4 illustrates the crossbar system 26 and first and second portions 28a, 28b of the support structure. The first and second portions 28a, 28b can be a component of the coarse elevation platform 16 of FIG. 3. In some examples, the support structure, including first and second portions 28a, 28b, can rotate with the coarse elevation platform 16. Thus, rotation of the coarse elevation platform 16 can cause the crossbar system 26 to rotate. Additionally, vibrations of a vehicle may be transmitted to the support structure. For example, referring to FIG. 1, vehicle vibrations can be transmitted from a vehicle to the base 12, from the base 12 to the coarse azimuth platform 14, from the coarse azimuth platform 14 to the coarse elevation platform 16, and from coarse elevation platform 16 to the crossbar system 26. Thus, the crossbar system 26 can experience vibrations at each distal end 23 where the crossbar system 26 mounts to the first and second portions 28a, 28b of the support structure. As will be described in greater detail below, the crossbar system 26 facilitates isolation of the sensor assembly mounted to the payload mount 22 from external vibrations propagating from the support structure and through the crossbar system, such that the external vibrations are damped, thus having little or no effect on the payload mount 22 and the payload mounted thereto. Relative movement between the fibers of the wire rope provide damping thru the friction of contact between the fibers. Elastic macro movement of the fiber bundles as constrained by the clamped intersections establish the stiffness of the crossbar and therefore the natural frequency of the suspended mass of the payload within the outer shell.

Figure 5:
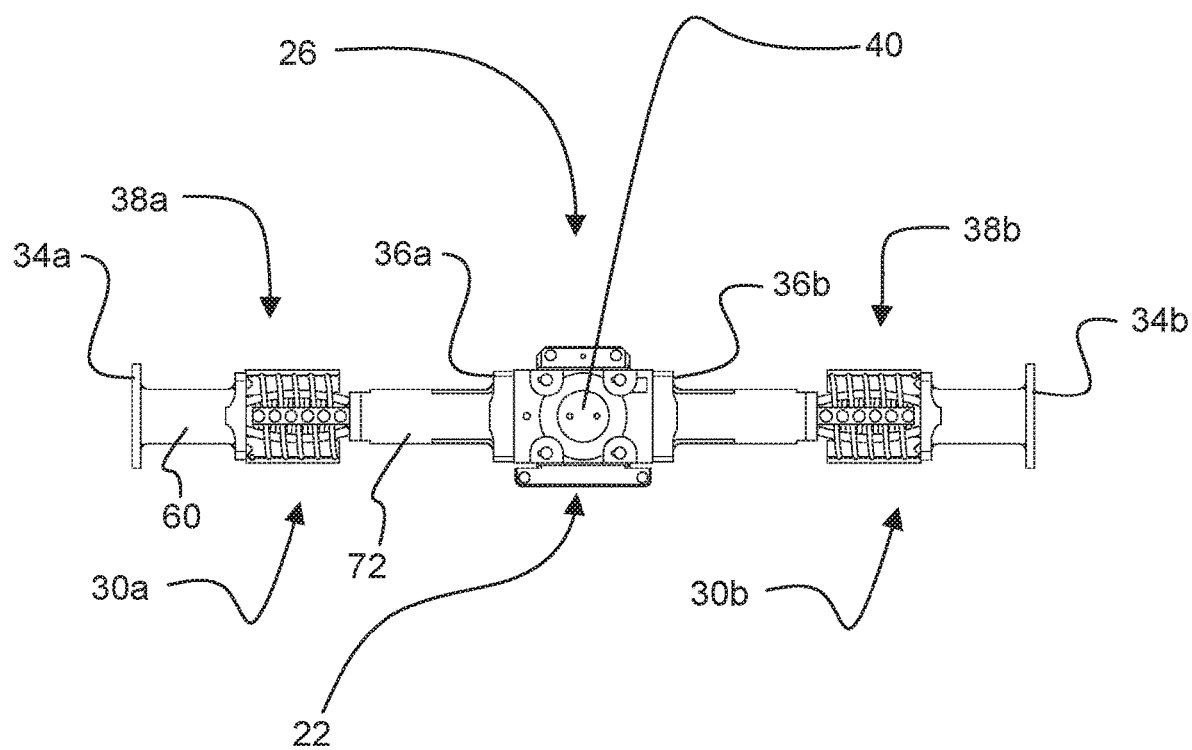
FIG. 5 illustrates a top view of the crossbar system shown in FIGS. 1 and 4 with the support structure not shown.

FIG. 5 illustrates the crossbar system 26 of FIG. 4 separated from the first and second portions 28a, 28b of the support structure. In the example shown, the crossbar system 26 comprises a first crossbar assembly 30a, a second crossbar assembly 30b, and a payload mount 22. The first crossbar assembly 30a comprises an outer crossbar segment 60 having a first structure interface 34a at a distal end, an inner crossbar segment 72 having a first payload mount interface 36a at a proximal end, and a first isolator 38a supported between the outer crossbar segment 60 with its first structure interface 34a and the inner crossbar segment 72 with its first payload mount interface 36a, The second crossbar assembly 30b comprises a second structure interface 34b, a second payload mount interface 36b, and a second isolator 38b supported between the second structure interface 34b and the second payload mount interface 36b. The second crossbar assembly 30b also includes outer crossbar segment 60 between the second structure interface 34b and second isolator 38b, and inner crossbar segment 72 between the second payload mount interface 36b and second isolator 38b, although they are not identified in FIG. 5.

The payload mount 22 can be coupled to the first payload mount interface 36a of the first crossbar assembly 30a, and to the second payload mount interface 36b of the second crossbar assembly 30b. The payload mount 22 can comprise a spherical joint (e.g., see spherical joint 40) or other joint operable to mount or otherwise support a sensor assembly. In one example, the payload mount 22 can comprise a cardan joint, such as the cardan joint described in U.S. patent application Ser. No. 16/721,662, filed Dec. 19, 2019, which is incorporated by reference herein in its entirety, wherein the cardan joint can comprise a suspension interface yoke that physically couples to the first and second payload mount interfaces 36a, 36b of the first and second crossbar assemblies 30a, 30b, respectively, and wherein the suspension interface yoke supports an inner assembly (e.g., a flexure, a payload interface assembly as part of a 3-axis gimbal, or others) that supports the sensor assembly (including the sensor). The payload mount 22 can enable the sensor assembly to adjust the positioning of a sensor relative to the coarse elevation platform 16. Thus, the coarse azimuth platform 14 and the coarse elevation platform 16 can provide coarse movement to the payload mount 22, which can enable the sensor assembly to make fine movements.

In some examples, the first crossbar assembly 30a and the second crossbar assembly 30b can be matching pairs having the same configuration, and that operate together to support, in a suspended state, the payload mount 22 (and the sensor assembly supported on the payload mount 22). For ease of discussion, the first crossbar assembly 30a of the crossbar system 26 will be described further with the understanding that the second crossbar assembly 30b can have the same configuration.

Figure 6:
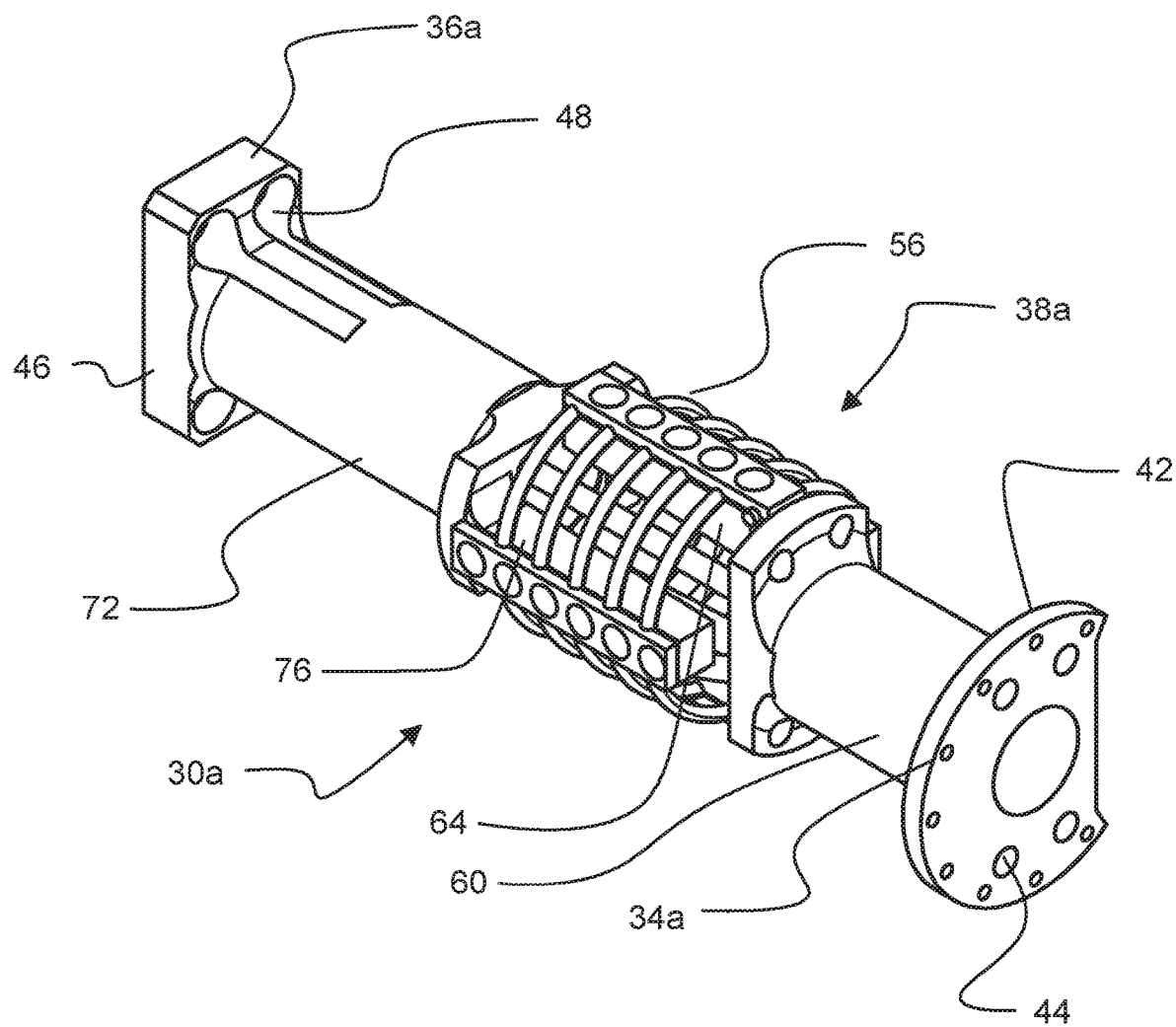
FIG. 6 illustrates an isometric view of a crossbar assembly of the crossbar system shown in FIGS. 1 and 4.

FIG. 6 illustrates the crossbar assembly 30a removed from the support structure and the payload mount 22. The structure interface 34a is operable to mount to the support structure, such as first portion 28a of FIG. 4. The structure interface 34a can comprise a flange 42 having features, such as holes 44 or threaded holes, that align with corresponding features of the support structure. The features of the flange 42 and the support structure can then be used to secure the crossbar assembly 30a to the support structure. For example, the structure interface 34a can be secured to the support structure by threading a bolt (not depicted) through a hole 44 of the flange 42 and into a threaded aperture or socket of the support structure. The payload mount interface 36a is operable to couple to a payload mount, such as the payload mount 22 of FIG. 5. The payload mount interface 36a can comprise a flange 46 extending from and supported by an end of an inner crossbar segment 66. The flange 46 can comprise features, such as holes 48 or threaded holes that align with corresponding features of the payload mount 22. The features of the flange 46 can then be used to secure the crossbar assembly 30a to the payload mount. For example, the payload mount 22 can be secured to the payload mount interface 36a by threading a bolt (not depicted) through a hole 48 of the flange 46 and into a threaded aperture or socket of the payload mount 22. The flange 46 can be integrally formed with the inner crossbar segment 66, or the flange 46 can comprise a separate component coupled to the inner crossbar segment 66.

Figure 7:
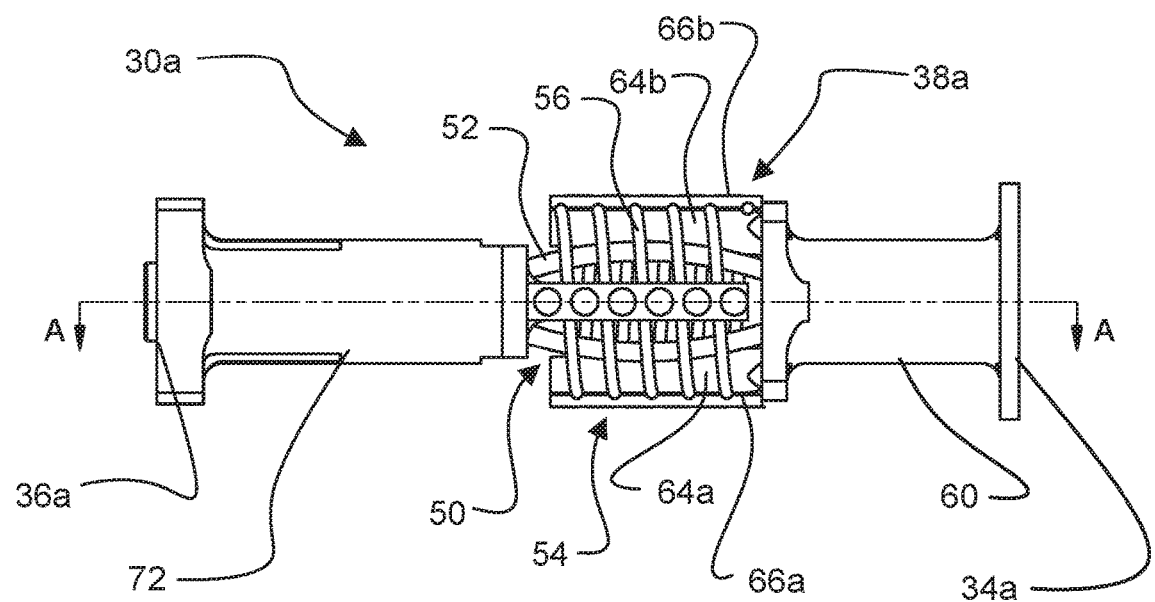
FIG. 7 illustrates a front view of the crossbar assembly shown in FIG. 6.
Figure 8:
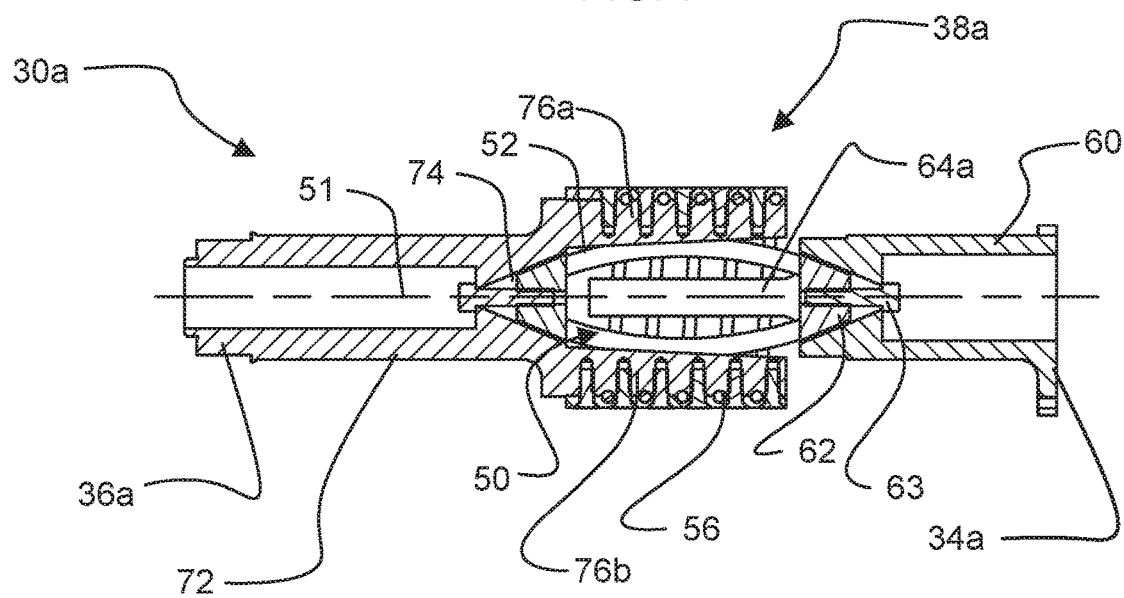
FIG. 8 illustrates a cross-sectional view of the crossbar assembly shown in FIG. 6 taken about line AA of FIG. 7.
Figure 9:
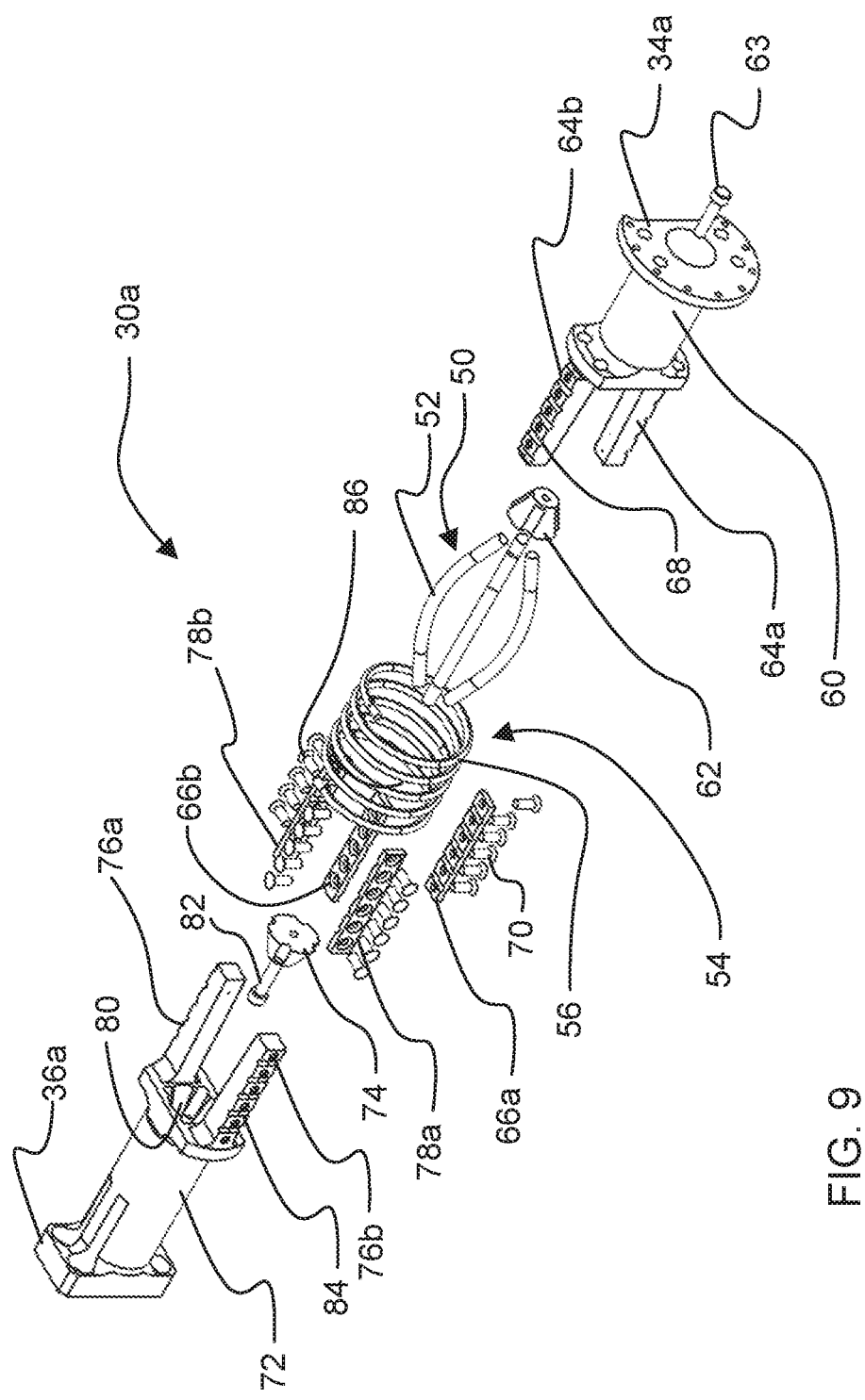
FIG. 9 illustrates an exploded view of the crossbar assembly shown in FIG. 6.

FIG. 7 illustrates the crossbar assembly 30a, and FIG. 8 illustrates a cross section of the crossbar assembly 30a, taken about line AA of FIG. 7. FIG. 9 illustrates an exploded view of the crossbar assembly 30a. With reference to FIGS. 7-9, and continued reference to FIGS. 1-6, the isolator 38a comprises a first wire rope assembly 50 comprising wire ropes 52 extending longitudinally between the outer crossbar segment 60 and the inner crossbar segment 72, and a second wire rope assembly 54 comprising a wire rope 56 extending circumferentially around appendages 64a and 64b (shown collectively as 64 in FIG. 6) of the outer crossbar segment 60 and appendages 76a and 76b (shown collectively as 76 in FIG. 6) of the inner crossbar segment 72. The first wire rope assembly 50 and the second wire rope assembly 54 together secure the outer crossbar segment 60 to the inner crossbar segment 72 and partially decouples the structure interface 34a from the payload mount interface 36a and dampens vibrations propagating through the crossbar assembly 30a between the structure interface 34a and the payload mount interface 36a, The first wire rope assembly 50 and the second wire rope assembly 54 can have a lower stiffness than the remaining components of the crossbar assembly 30a. The lower stiffness of the first and second wire rope assemblies 50, 54 results in the crossbar assembly 30a having a lower resonant frequency compared to a uniform crossbar of a higher stiffness material. The lower resonant frequency can result in a reduction or damping of vibrations transmitted through the crossbar assembly 30a when the vibrations have a frequency higher than the resonant frequency.

The outer crossbar segment 60 can be coupled to the isolator 38a. The outer crossbar segment 60 can further comprise an outer isolator interface 61 operable to interface with at least a portion of the isolator 38a. In the example shown, the outer isolator interface can comprise a clamp operable to secure the first wire rope assembly 50 to the outer crossbar segment 60, first and second appendages 64a, 64b extending longitudinally from the outer crossbar segment 60 towards the inner crossbar segment 72, and first and second clamping plates 66a, 66b operable to secure the second wire rope assembly 54 to the first and second appendages 64a, 64b.

In some examples, the clamp of the outer isolator interface can comprise a conical clamp 62, The conical clamp 62 can be sized and shaped to be received in a tapered recess in the outer crossbar segment 60. A fastener (e.g., bolt 63) can couple the conical clamp 62 to the outer crossbar segment 60 within the tapered recess. An outer, end portion of each of the wire ropes 52 of the first wire rope assembly 50 can be located between an outer surface of the conical clamp 62 and a lateral surface of the tapered recess of the outer crossbar segment 60. Tightening the fastener urges the conical clamp 62 into the tapered recess, capturing the outer, end portions of the wire ropes 52 between the conical clamp 62 and the tapered recess of the outer crossbar segment 60. The conical clamp 62 can further comprise respective recesses formed in its outer surface that receive at least a portion of the respective wire ropes 52.

The first and second appendages 64a, 64b extend longitudinally from the outer crossbar segment 60 away from the first structure interface 34a and toward the inner crossbar segment 72. The first and second appendages 64a, 64b can each comprise a series of slots 68 at least partially formed therein for receiving a portion of the wire rope 56 of the second wire rope assembly 54. The first and second clamping plates 66a, 66b can be configured to be coupled to the respective first and second appendages 64a, 64b to cover the series of slots 68, and to clamp down on the wire rope 56 seated within the slots, such as by securing the first and second clamping plates 66a, 66b with fasteners. Each slot of the series of slots 68 can have a depth less than an outer diameter of the wire rope 56 of the second wire rope assembly 54, such that when the first and second clamping plates 66a, 66b are secured over the first and second appendages 64a, 64b with the various coils of the wire rope 56 of the second rope assembly 54 seated in respective slots, the wire rope 56 is secured by the first and second clamping plates 66a, 66b to the first and second appendages 64a, 64b of the outer crossbar segment 60. As shown in FIG. 9, the first and second clamping plates 66a, 66b can be secured to the respective first and second appendages 64a, 64b of the outer crossbar segment 60 using conventional fasteners, such as screws, bolts, adhesives and the like. In the example of FIGS. 7-9, the fasteners comprise screws 70 extending through the first and second clamping plates 66a, 66b and into threaded sockets of the first and second appendages 64a, 64b. Tightening the screws 70 urges the first and second clamping plates 66a, 66b towards the first and second appendages 64a, 64b, thus clamping and securing the wire rope 56 in the series of slots 68 and to the outer crossbar segment 60.

The inner crossbar segment 72 can comprise an inner isolator interface operable to interface with at least a portion of the first isolator 38a. In the example shown, the inner isolator interface can comprise a clamp operable to secure the first wire rope assembly 50 to the inner crossbar segment 72, first and second appendages 76a, 76b extending longitudinally from the inner crossbar segment 72 towards the outer crossbar segment 60, and first and second clamping plates 78a, 78b operable to secure the second wire rope assembly 54 to the first and second appendages 76a, 76b.

In some examples, the clamp of the inner isolator interface can comprise a conical clamp 74. The conical clamp 74 can be sized and shaped to be received in a tapered recess 80 in the inner crossbar segment 72. A fastener (e.g., bolt 82) can couple the conical clamp 74 to the inner crossbar segment 72 within the tapered recess. An outer, end portion of each of the wire ropes 52 of the first wire rope assembly 50 can be located between an outer surface of the conical clamp 74 and a lateral surface of the tapered recess 80 of the inner crossbar segment 72. Tightening the fastener urges the conical clamp 74 into the tapered recess 80, capturing the outer, end portions of the wire ropes 52 between the conical clamp 74 and the tapered recess 80 of the inner crossbar segment 72. The conical clamp 74 can further comprise respective recesses formed in its outer surface that receive at least a portion of the respective wire ropes 52.

The first and second appendages 76a, 76b extend longitudinally from the inner crossbar segment 72 away from the first payload mount interface 36a and toward the outer crossbar segment 60. The first and second appendages 76a, 76b can each comprise a series of slots 84 at least partially formed therein for receiving a portion of the wire rope 56 of the second wire rope assembly 54. The first and second clamping plates 78a, 78b can each be configured to be coupled to the respective first and second appendages 76a, 76b to cover the series of slots 84, and to clamp down on the wire rope 56 seated within the slots, such as by securing the first and second clamping plates 78a, 78b with fasteners. Each slot of the series of slots 84 can have a depth less than the diameter of the wire rope 56 of the second wire rope assembly 54, such that when the first and second clamping plates 78a, 78b are secured over the first and second appendages 76a, 76b with the various coils of the wire rope 56 of the second wire rope assembly 54 seated in respective slots, the wire rope 56 is secured by the first and second clamping plates 78a, 78b to the first and second appendages 76a, 76b of the inner crossbar segment 72. The first and second clamping plates 78a, 78b can be secured to the respective first and second appendages 76a, 76b of the inner crossbar segment 72 using conventional fasteners, such as screws, bolts, adhesives and the like. In the example of FIGS. 7-9, the fasteners comprise screws 86 extending through the first and second clamping plates 78a, 78b and into threaded sockets of the first and second appendages 76a, 76b. Tightening the screws 86 urges the first and second clamping plates 78a, 78b towards the first and second appendages 76a, 76b, thus clamping and securing the wire rope 56 in the series of slots 84 and to the inner crossbar segment 72.

The wire ropes 52 of the first wire rope assembly 50 can exit each of the tapered recesses at an angle offset from a common central longitudinal axis 51 of the outer and inner crossbar segments 60, 72. Thus, the wire ropes 52 can be orientated at an offset angle relative to the common central longitudinal axis 51 immediately adjacent the outer and inner crossbar segments 60, 72 and can curve back towards the common central longitudinal axis 52 as they extend longitudinally between the outer and inner crossbar segments 60, 72. The curvature of the wire ropes 52 allows the outer and inner crossbar segments 60, 72 to displace relative to one another, with the wire ropes 52 configured to bend to facilitate relative movement of the outer and inner crossbar segments 60, 72 towards one another, and the wire ropes 52 configured to straighten to facilitate movement of the outer and inner crossbar segments 60, 72 away from one another.

The wire rope 56 of the second wire rope assembly 54 couples the appendages 64, 76 of the outer and inner crossbar segments 60, 72 together. Each of the first and second appendages 64a, 64b of the outer crossbar segment 60 extends between the first and second appendages 76a, 76b of the inner crossbar segment 72, such that the wire rope 56 is coupled to alternating appendages of the outer crossbar segment 60 and the inner crossbar segment 72. The wire rope 56 may wrap helically around the group of appendages of the outer and inner crossbar segments 60, 72. Thus, the second wire rope assembly 54 flexibly couples the outer crossbar segment 60 to the inner crossbar segment 72, while still allowing for displacement between the outer crossbar segment 60 and the inner crossbar segment 72. In this arrangement, the isolator 38a facilitates relative movement between the first and second crossbar segments 60 and 72, respectively, in multiple degrees of freedom, or along/about multiple axes. The multiple degrees of freedom of relative movement can comprise three rotational degrees of freedom and three translational degrees of freedom.

While the example of FIGS. 6-9 is shown with each of the outer and inner crossbar segments 60, 72 having two appendages 64, 76, in other examples the outer and inner crossbar segments 60, 72 may have additional appendages. For example, if a greater stiffness of the first isolator 38a is desired, additional appendages may be added. Additionally, while the example of FIGS. 6-9 is shown with four wire ropes 52 arranged symmetrically about the common central longitudinal axis 51, other numbers of wire ropes and arrangements are possible and contemplated herein, as will be recognized by those skilled in the art. For example, additional wire ropes may be added to increase the stiffness of the first isolator 38a. As discussed further below, stiffness of the first isolator 38a can be varied by altering various properties of the wire rope 56 and/or the wire ropes 52, such as a spring constant or stiffness of the wire rope 56 and/or the wire ropes 52. This can be achieved by providing wire ropes formed from different materials, providing wire ropes of different sizes and/or configurations (e.g., various diameters, lengths), as will be apparent to those skilled in the art.

When assembled, the wire ropes 52, 56 of the first and second rope assemblies 50, 54 serve to secure the outer crossbar segment 60 to the inner crossbar segment 72 while partially decoupling movement of the outer crossbar segment 60 from the inner crossbar segment 72. The lower stiffness of the wire ropes 52, 56 relative to the outer and inner crossbar segments 60, 72 facilitates the relative movement between the outer crossbar segment 60 and the inner crossbar segment 72. Additionally, friction within the wire ropes 52, 56 may provide a further dampening function to further dissipate vibrations propagating between the first structure interface 34a and the first payload mount interface 36a.

The resonance frequencies and modes of the first crossbar assembly 30a can be tuned for a particular application. For example, by varying the configuration of the first wire rope assembly 50 and the second wire rope assembly 54 different resonant frequencies can be achieved in different modes. For example, the material makeup of the wire ropes 52, 56 can affect the resonance frequency and the amount of damping provided within by the ropes 52, 56. In some examples, the wire ropes 52, 56 can comprise a metal wire including, without limitation, steel wire, stainless steel wire, aluminum wire, titanium wire, or beryllium copper wire. The relative stiffness and damping of the wire rope can also be varied based on the selection of the base wire and the arrangement of wire fibers within the wire rope. For example, a wire rope having finer wire fibers can have a lower stiffness than a similarly sized and type of wire rope having thicker wire fibers. In some examples, the wire ropes 52 of the first rope assembly 50 may have a larger diameter than the wire ropes 56 of the second wire rope assembly 54, which can assist in tuning of the crossbar assembly. In one example, the outer diameter of the wire ropes 52 of the first wire rope assembly 50 can be between 0.125 inches and 0.175 inches and the wire ropes 56 of the second wire rope assembly 54 can be between 0.075 and 0.125 inches. Additionally, the modes can be tuned by varying other configurations such as the number of wire ropes 52, 56, the diameter of the wire ropes 52, 56, the curvature of the wire ropes 52 of the first wire rope assembly 50, the helical angle of the wire rope 56 of the second wire rope assembly 54, the number of appendages 64, 76, the inner diameter of the helix of the second wire rope assembly 54, the number of wire fibers, subgrouping of wire fibers, and any combination of any of the variables discussed herein. The inner diameter of the second wire rope assembly 54 can be adjusted by changing the radial distance of the appendages from the common central longitudinal axis 51. For example, increasing the distance of first and second appendages 64a, 64b from the common central longitudinal axis 51 can result in the inner diameter of the second wire rope assembly 54 to be increased. In some examples, appendages 64a, 64b of the outer crossbar segment 60 may have a different radial distance from the common central longitudinal axis 51 than the appendages 76a, 76b of the inner crossbar segment 72, such that the second wire rope assembly 54 may have an elliptical configuration. The elliptical configuration of the second wire rope assembly can enable the crossbar assembly to be tuned to have different modes in different directions.

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

What is claimed is:

1. A crossbar system facilitating isolation of a sensor assembly from external vibrations of a structure, the crossbar system comprising:
   a first crossbar assembly comprising a first structure interface operable to mount to a structure, a first payload mount interface operable to couple to a payload mount, and a first isolator between the first structure interface and the first payload mount interface, the first isolator comprising a first wire rope assembly having at least two wire ropes extending longitudinally and a second wire rope assembly having at least one wire rope extending circumferentially, the first and second wire rope assemblies operable to partially decouple the first structure interface and the first payload mount interface and dampen vibrations propagating through the first crossbar assembly;

a second crossbar assembly comprising a second structure interface operable to mount to the structure, a second payload mount interface operable to couple to the payload mount, and a second isolator between the second structure interface and the second payload mount interface, the second isolator comprising a third wire rope assembly having at least two wire ropes extending longitudinally and a fourth wire rope assembly comprising at least one wire rope extending circumferentially, the third and fourth wire rope assemblies operable to partially decouple the first structure interface and the second payload mount interface and dampen vibrations propagating through the second crossbar assembly; and a payload mount coupled to the first payload mount interface and the second payload mount interface, the payload mount operable to mount a sensor assembly.

2. The crossbar system of claim 1, wherein the first crossbar assembly further comprises a first outer crossbar segment coupled to the first structure interface and the first isolator, and a first inner crossbar segment coupled to the first payload mount interface and the first isolator, and wherein the second crossbar assembly further comprises a second outer crossbar segment coupled to the second structure interface and the second isolator, and a second inner crossbar segment coupled to the second payload mount interface and the second isolator.

3. The crossbar system of claim 2, wherein each wire rope of the at least two wire ropes of the first wire rope assembly is coupled to the first outer crossbar segment at a first end of each respective wire rope at an angle offset from a central axis of the first outer crossbar segment and to the inner crossbar segment at a second end of each respective wire rope at an angle offset from a central axis of the first inner crossbar segment.

4. The crossbar system of claim 2, wherein the second wire rope assembly comprises an inner crossbar appendage and an outer crossbar appendage, wherein the at least one wire rope of the second wire rope assembly is coupled to the inner crossbar appendage and the outer crossbar appendage.

5. The crossbar system of claim 4, further comprising a first clamping plate operable to clamp the at least one wire rope of the second wire rope assembly between the first clamping plate and the inner crossbar appendage and a second clamping plate operable to clamp the at least one wire rope of the second wire rope assembly between the second clamping plate and the outer crossbar appendage.

6. The crossbar system of claim 4, further comprising a first conical clamp and a second conical clamp, wherein the first conical clamp secures the at least two wire ropes of the first wire rope assembly to the inner crossbar segment and the second conical clamp secures the at least two wire ropes of the first wire rope assembly to the outer crossbar segment.

7. A crossbar assembly for facilitating isolation of a sensor assembly from external vibration of a payload system mount on a vehicle, the crossbar assembly comprising:

an outer crossbar segment comprising a payload mount interface operable to mount to a payload mount, and an outer isolator interface operable to mount to an isolator;

an inner crossbar segment moveable relative to the outer crossbar segment in multiple degrees of freedom, the inner crossbar segment comprising a structure interface operable to mount to a structure, and an inner isolator interface operable to mount to the isolator; and an isolator supported by the outer and inner crossbar segments, the isolator comprising a first wire rope assembly comprising at least two wire ropes extending longitudinally from the outer crossbar segment to the inner crossbar segment, and a second wire rope assembly comprising at least one wire rope extending circumferentially between the outer crossbar segment and the inner crossbar segment, wherein the isolator operates to partially decouple the outer crossbar segment from the inner crossbar segment and dampen vibrations propagating between the outer and inner crossbar segments.

8. The crossbar assembly of claim 7, wherein the outer isolator interface comprises a first clamp operable to secure the at least two wire ropes of the first wire rope assembly to the outer isolator interface, at least one appendage extending longitudinally from the outer crossbar segment, and at least one clamp operable to secure the at least one wire rope of the second wire rope assembly to the at least one appendage.

9. The crossbar assembly of claim 7, wherein the inner isolator interface comprises a first clamp operable to secure the at least two wire ropes of the first wire rope assembly to the outer isolator interface, at least one appendage extending longitudinally from the inner isolator interface, and at least one clamp operable to secure the at least one wire rope of the second wire rope assembly to the at least one appendage.

10. The crossbar assembly of claim 7, wherein each wire rope of the at least two wire ropes of the first wire rope assembly is coupled to the outer crossbar segment at a first end of each respective wire rope at an angle offset from a central axis of the first outer crossbar segment and to the inner crossbar segment at a second end of each respective wire rope at an angle offset from a central axis of the first inner crossbar segment.

11. The crossbar assembly of claim 7, wherein each wire rope of the first wire rope assembly has an outer diameter greater than each wire rope of the second wire rope assembly.

12. The crossbar assembly of claim 7, wherein the inner isolator interface comprises a first plurality of appendages extending longitudinally from the inner isolator interface and the outer isolator interface comprises a second plurality of appendage extending longitudinally from the outer isolator interface, wherein each appendage of the first plurality of appendages is located between two appendages of the second plurality of appendages.

13. The crossbar assembly of claim 12, wherein each wire rope of the second wire rope assembly is helically wound around the first and second plurality of appendages about a central longitudinal axis of the crossbar assembly.

14. The crossbar assembly of claim 7, wherein the at least two wire ropes of the first wire rope assembly are symmetrically arranged about a central longitudinal axis of the crossbar assembly.

15. A payload system mount comprising:
a base structure;
a support structure rotatably coupled to the base structure;
a crossbar system supported by the support structure, the crossbar system comprising:

a first crossbar assembly comprising a first structure interface coupled to the support structure, a first payload mount interface operable to couple to a payload mount, and a first isolator between the first structure interface and the first payload mount interface, the first isolator comprising a first wire rope assembly having at least two wire ropes extending longitudinally and a second wire rope assembly having at least one wire rope extending circumferentially, the first and second wire rope assemblies operable to partially decouple the first structure interface and the first payload mount interface and dampen vibrations propagating through the first crossbar assembly;

a second crossbar assembly comprising a second structure interface coupled to the support structure, a second payload mount interface operable to couple to the payload mount, and a second isolator between the second structure interface and the second payload mount interface, the second isolator comprising a third wire rope assembly having at least two wire ropes extending longitudinally and a fourth wire rope assembly comprising at least one wire rope extending circumferentially, the third and fourth wire rope assemblies operable to partially decouple the first structure interface and the second payload mount interface and dampen vibrations propagating through the second crossbar assembly;

a payload mount coupled to the first payload mount interface and the second payload mount interface; and a sensor assembly coupled to the payload mount, the sensor assembly comprising at least one sensor.

16. The payload system mount of claim 15, wherein the first crossbar assembly further comprises a first outer crossbar segment coupled to the first structure interface and the first isolator, and a first inner crossbar segment coupled to the first payload mount interface and the first isolator, and wherein the second crossbar assembly further comprises a second outer crossbar segment coupled to the second structure interface and the second isolator, and a second inner crossbar segment coupled to the second payload mount interface and the second isolator.

17. The payload system mount of claim 16, wherein each wire rope of the at least two wire ropes of the first wire rope assembly is coupled to the first outer crossbar segment at a first end of each respective wire rope at an angle offset from a central axis of the first outer crossbar segment and to the inner crossbar segment at a second end of each respective wire rope at an angle offset from a central axis of the first inner crossbar segment.

18. The sensor system of claim 17, wherein the second wire rope assembly comprises an inner crossbar appendage and an outer crossbar appendage, wherein the at least one wire rope of the second wire rope assembly is coupled to the inner crossbar appendage and the outer crossbar appendage.

19. The sensor system of claim 18, further comprising a first clamping plate operable to clamp the at least one wire rope of the second wire rope assembly between the first clamping plate and the inner crossbar appendage and a second clamping plate operable to clamp the at least one wire rope of the second wire rope assembly between the second clamping plate and the outer crossbar appendage.

20. The sensor system of claim 18, further comprising a first conical clamp and a second conical clamp, wherein the first conical clamp secures the at least two wire ropes of the first wire rope assembly to the inner crossbar segment and the second conical clamp secures the at least two wire ropes of the first wire rope assembly to the outer crossbar segment.

* * * * *